United States Patent [19]

Miya et al.

[11] Patent Number: 6,040,367
[45] Date of Patent: Mar. 21, 2000

[54] POLYCARBONATE RESIN COMPOSITION

[75] Inventors: Shinya Miya; Satoshi Kanayama, both of Hiratsuka, Japan

[73] Assignee: Mitsubishi Engineering-Plastics Corporation, Japan

[21] Appl. No.: 09/127,712

[22] Filed: Jul. 29, 1998

Related U.S. Application Data

[63] Continuation of application No. 08/805,805, Feb. 25, 1997, Pat. No. 5,948,838.

[30] Foreign Application Priority Data

| Mar. 6, 1996 | [JP] | Japan | 8-48700 |
| Mar. 27, 1996 | [JP] | Japan | 8-71860 |
| Mar. 27, 1996 | [JP] | Japan | 8-71861 |
| Apr. 17, 1996 | [JP] | Japan | 8-95269 |
| Apr. 17, 1996 | [JP] | Japan | 8-95270 |
| Apr. 30, 1996 | [JP] | Japan | 8-109189 |
| May 15, 1996 | [JP] | Japan | 8-120066 |

[51] Int. Cl.$^7$ .................................................. G08K 5/15
[52] U.S. Cl. ........................ 524/107; 524/110; 524/111; 524/114
[58] Field of Search ......................... 524/107, 110, 524/111, 114

[56] References Cited

U.S. PATENT DOCUMENTS

| 4,255,301 | 3/1981 | Minagawa et al. | 260/18 |
| 4,342,681 | 8/1982 | Idel et al. | 524/108 |
| 4,576,982 | 3/1986 | Tyrell et al. | 524/111 |
| 4,874,802 | 10/1989 | Lundy et al. | 524/378 |
| 4,904,710 | 2/1990 | Nace | 524/378 |
| 4,965,303 | 10/1990 | Kishimoto | 524/108 |
| 4,968,756 | 11/1990 | Silvis et al. | 525/456 |
| 5,118,726 | 6/1992 | Mizutani et al. | 524/378 |
| 5,187,211 | 2/1993 | Lundy et al. | 524/107 |
| 5,214,078 | 5/1993 | Powell et al. | 524/378 |
| 5,280,050 | 1/1994 | Powell et al. | 524/378 |
| 5,348,999 | 9/1994 | de Jong et al. | 524/378 |
| 5,484,828 | 1/1996 | Dunay et al. | 524/111 |
| 5,486,555 | 1/1996 | Hirata et al. | 524/83 |
| 5,491,179 | 2/1996 | Mason | 523/136 |
| 5,514,767 | 5/1996 | Sakashita et al. | 524/378 |

FOREIGN PATENT DOCUMENTS

| 0 272 421 A2 | 6/1988 | European Pat. Off. . |
| 0 296 473 A2 | 12/1988 | European Pat. Off. . |
| 2 337 175 | 7/1977 | France . |

*Primary Examiner*—Kriellion Sanders
*Attorney, Agent, or Firm*—Parkhurst & Wendel, L.L.P.

[57] ABSTRACT

The present invention relates to a polycarbonate resin composition comprising 100 parts by weight of a polycarbonate resin; 0.01 to 5 parts by weight of a compound containing oxymethylene unit, a compound containing oxymethylene unit having substituent or a cyclic ether compound having substituent.

3 Claims, No Drawings

POLYCARBONATE RESIN COMPOSITION

This is a Continuation of application Ser. No. 08/805,805 filed Feb. 25, 1997 now U.S. Pat. No. 5,448,838.

BACKGROUND OF THE INVENTION

The present invention relates to a polycarbonate resin composition, and more particularly it relates to a polycarbonate resin composition having an excellent resistance to an ionizing radiation, in which a compound containing oxymethylene unit, a compound containing oxymethylene unit having substituent or a cyclic ether compound having substituent is blended therewith.

Polycarbonate resins have been widely utilized in the fields of medical supplies and appliances because the polycarbonate resins have excellent mechanical strength, impact resistance, heat resistance and transparency as well as a high safety.

The medical supplies and appliances are generally sterilized upon use. Specifically, the sterilization of these medical supplies and appliances has been carried out by a high-pressure steam sterilization process, an ethyleneoxide gas (EOG) sterilization process, or a sterilization process using an ionizing radiation such as a gamma radiation or an electron beam. Among these sterilization processes, the high-pressure steam sterilization process has disadvantages such as high energy cost and necessity of a drying step after the sterilization. Similarly, the EOG sterilization process has caused such problems as toxicity of ethyleneoxide itself or environmental pollution upon disposal thereof. Under these circumstances, a recent tendency is such that the sterilization process using an ionizing radiation, generally a gamma radiation has been predominately adopted because the sterilization process is relatively inexpensive and can be performed at a low temperature in a dry condition.

However, there also is such a problem that the polycarbonate resin suffers from yellow discoloration when exposed to the ionizing radiation for sterilization thereof. This results in considerable deterioration in utility value of the products, especially when the polycarbonate resin is applied to the medical supplies or appliances.

As means for solving these problems, there have been proposed a polycarbonate resin composition in which a halogen-containing polycarbonate resin is blended (Japanese Patent Application Laid-open (KOKAI) No. 2-55062 (1990)), a polycarbonate resin composition in which a brominated phthalic acid derivative is blended (Japanese Patent Application Laid-open (KOKAI) No. 5-179127 (1993)), or the like. However, metal corrosion is likely to generate due to the halogen in the resin compositions, so that a molding machine or the like therefor are required to be made from special metal material having a corrosion resistance.

In order to solve the afore-mentioned problems such as yellow discoloration or the like, there have been also proposed a polycarbonate resin composition in which thio-alcohols are blended (Japanese Patent Application Laid-open (KOKAI) No. 1-229052 (1989)), a polycarbonate resin composition in which thio-ethers are blended (Japanese Patent Application Laid-open (KOKAI) No. 2-115260 (1990)), a polycarbonate resin composition in which compounds having a mercapto group are blended (Japanese Patent Application Laid-open (KOKAI) Nos. 2-49058 (1990), 4-36343 (1992) and 6-166807 (1994)), a polycarbonate resin composition in which polyalkylene-oxide and an aromatic compound having a sulfonate group are blended in combination (Japanese Patent Application Laid-open (KOKAI) No. 5-209120 (1993)), and a polycarbonate resin composition in which compounds having a sulfide group are blended (Japanese Patent Application Laid-open (KOKAI) No. 6-93192 (1994) and 6-248170 (1994)). However, there still exist such problems that the yellow discoloration cannot be sufficiently prevented, or environmental conditions deteriorate due to generation of malodor upon forming, or the like.

Furthermore, in order to solve the afore-mentioned problems, Japanese Patent Application Laid-open publication (KOKAI) No. 61-215651 (1986) discloses a polycarbonate resin composition in which boron compounds are blended, Japanese Patent Application Laid-open (KOKAI) No. 62-135556 (1987) discloses a polycarbonate resin composition in which polyetherpolyol or an alkyl ether thereof are blended, Japanese Patent Application Laid-open (KOKAI) No 2-232258 (1990) discloses a polycarbonate resin composition in which benzyl alcohol derivatives are blended, and Japanese Patent Application Laid-open (KOKAI) No. 2-132147 (1990) discloses a polycarbonate resin composition in which itaconic acid, benzaldehyde-dimethylacetal, benzaldehyde-propyleneglycolacetal, etc. are blended. However, there have caused such problems that the yellow discoloration cannot be sufficiently prevented or otherwise, if the amounts of the compounds used therein increases to an extent sufficient to prevent the yellow discoloration, the other properties of the polycarbonate resin compositions are adversely affected.

In view of these problems encountered in the prior arts, it is demanded in a polycarbonate resin composition to maintain the inherent properties thereof, generate little malodor upon forming and prevent generation of yellow discoloration upon irradiation of an ionizing radiation for sterilization.

As a result of the present inventors' earnest studies for solving the afore-mentioned problems, it has been found that a polycarbonate resin composition prepared by blending a compound containing oxymethylene unit, a compound containing oxymethylene unit having substituent or a cyclic ether compound having substituent and a specific compound with a polycarbonate resin at specified blending ratios, not only maintains inherent properties of polycarbonate resin without deterioration but also prevents generation of yellow discoloration upon sterilization using an ionizing radiation. The present invention has been achieved on the basis of the findings.

SUMMARY OF THE INVENTION

It is an object of the present invention to provide a polycarbonate resin composition which confines to a very low yellow discoloration when exposed to an ionizing radiation for sterilization, while preventing deterioration of inherent properties thereof.

To accomplish the aims, in a first aspect of the present invention, there is provided a polycarbonate resin composition comprising 100 parts by weight of a polycarbonate resin; 0.01 to 5 parts by weight of a compound containing oxymethylene unit, a compound containing oxymethylene unit having substituent or a cyclic ether compound having substituent.

In a second aspect of the present invention, there is provided a polycarbonate resin composition comprising 100 parts by weight of a polycarbonate resin; 0.01 to 5 parts by weight of a compound containing oxymethylene unit, a compound containing oxymethylene unit having substituent or a cyclic ether compound having substituent; and 0.01 to 5 parts by weight of at least one compound selected from the group consisting of: (A) a compound containing sulfonate groups; (B) a compound containing cyclic acetal groups; (C) an aromatic compound containing oxy groups or carbonyl groups; (D) a polyalkylene glycol, the ether of polyalkylene glycol or the ester of polyalkylene glycol; (E) a sulfide compound, sulfoxide compound or sulfone compound; and (F) a cinnamyl-based compound.

DETAILED DESCRIPTION OF THE INVENTION

The present invention is described in detail below.

The polycarbonate resin used in the composition according to the present invention may be homopolymers or copolymers of a linear or branched thermoplastic aromatic polycarbonate prepared by reacting an aromatic dihydroxy compound or a mixture of the aromatic dihydroxy compound and a small amount of a polyhydroxy compound with phosgene or diester of carbonic acid.

As the aromatic dihydroxy compounds, bis(hydroxyaryl) alkanes such as 2,2-bis(4-hydroxyphenyl)propane (=bisphenol A), 2,2-bis(3,5-dibromo-4-hydroxyphenyl) propane (=tetrabromo-bisphenol A), bis(4-hydroxyphenyl) methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-t-butyl-4-hydroxyphenyl)propane, 2,2-bis(4-hydroxy-3,5-dimethylphenyl)propane, 2,2-bis(3-bromo-4-hydroxyphenyl)propane, 2,2-bis(3,5-dichloro-4-hydroxyphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenyl ethane or bis(4-hydroxyphenyl)diphenylmethane; bis(hydroxyaryl)cycloalkanes such as 1,1-bis(4-hydroxyphenyl)cyclopentane or 1,1-bis(4-hydroxyphenyl) cyclohexane; dihydroxy-diaryl ethers such as 4,4'-dihydroxy-diphenyl ether or 4,4-dihydroxy-3,3'-dimethyl-diphenyl ether; dihydroxy-diaryl sulfides such as 4,4'-dihydroxy-diphenyl sulfide or 4,4'-dihydroxy-3,3'-dimethyldiphenyl sulfide; dihydroxy-diaryl sulfoxides such as 4,4'-dihydroxy-diphenyl sulfoxide or 4,4'-dihydroxy-3,3'-dimethyldiphenyl sulfoxide; dihydroxy-diaryl sulfones such as 4,4'-dihydroxy-diphenyl sulfone or 4,4'-dihydroxy-3,3'-dimethyldiphenyl sulfone; hydroquinone; resorcin; 4,4'-dihydroxy-diphenyl; or the like may be exemplified. These aromatic dihydroxy compounds may be used singly or in the form of the mixture thereof. Among them, 2,2-bis(4-hydroxyphenyl)propane is preferred.

In addition, branched polycarbonate resins can be obtained by using a polyhydroxy compound such as fluoroglucine, 2,6-dimethyl-2,4,6-tri(4-hydroxyphenyl)-3-heptene, 4,6-dimethyl-2,4,6-tri(4-hydroxyphenyl)-2-heptene, 1,3,5-tri(2-hydroxyphenyl)benzole, 1,1,1-tri(4-hydroxyphenyl)ethane, 2,6-bis(2-hydroxy-5-methylbenzyl)-4-methylphenol or a,a',a"-tri(4-hydroxyphenyl)-1,3,5-triisopropylbenzene; 3,3-bis(4-hydroxyaryl)-oxindole (=isatin-bisphenol); 5-chloroisatin-bisphenol; 5,7-dichloroisatin-bisphenol; 5-bromoisatin-bisphenol; or the like.

In the case where the polycarbonate resin is prepared according to a phosgene method, the reaction may be carried out in the presence of a terminator or a molecular weight modifier. Specific examples of the terminators or molecular weight modifiers may include phenol, p-t-butyl phenol or tribromophenol, a long-chain alkylphenol, aliphatic carboxylic acid chloride, aliphatic carboxylic acid, hydroxybenzoic acid alkyl ester, alkylether-phenol or the like. In the preparation of the polycarbonate resin used in the present invention, these terminators or molecular weight modifiers can be used singly or in the form of the mixture thereof.

The polycarbonate resin used in the present invention has a viscosity-average molecular weight of 10,000 to 100,000, preferably 15,000 to 50,000 calculated from the solution viscosity measured at 25° C. in terms of a solution viscosity using methylene chloride as a solvent.

The compound containing oxymethylene unit and compound containing oxymethylene unit having substituent used in the composition according to the present invention, are represented by the following formula (1) or (2):

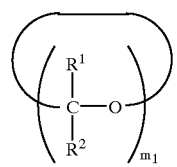

(1)

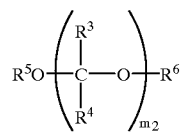

(2)

where $R^1$, $R^2$, $R^3$ and $R^4$ are independently a hydrogen atom, a $(C_1-C_{30})$alkyl group, $(C_3-C_{30})$cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl$(C_2-C_{30})$alkenyl group, hydroxy group, a $(C_1-C_{30})$alkoxy group, a $(C_1-C_{30})$acyl group or a $(C_1-C_{30})$acyloxy group, in which the said aryl group, the said arylalkyl group and the said arylalkenyl group may have substituent group(s) bonded to the aromatic ring thereof, the substituent group(s) being a $(C_1-C_{10})$alkyl group or a halogen atom; $R^5$ and $R^6$ are independently a hydrogen atom, a $(C_1-C_{30})$alkyl group, a $(C_3-C_{30})$ cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl $(C_2-C_{30})$alkenyl group or a $(C_1-C_{30})$acyl group, in which the said aryl group, the said arylalkyl group and the said arylalkenyl group may have substituent group(s) bonded to the aromatic ring thereof, the substituent group(s) being a $(C_1-C_{10})$alkyl group or a halogen atom; $m_1$ is an integer of not less than 3; and $m_2$ is an integer of not less than 1.

$R^1$, $R^2$, $R^3$ and $R^4$ are preferably a hydrogen atom, a $(C_1-C_{30})$alkyl group, a $(C_2-C_{30})$alkenyl group, a $(C_6-C_{30})$ aryl group, a $(C_6-C_{30})$aryl$(C_1-C_{30})$alkyl group or a $(C_6-C_{30})$aryl$(C_1-C_{30})$alkenyl group, more preferably a hydrogen atom, a $(C_1-C_{30})$alkyl group or a $(C_2-C_{30})$alkenyl group. $R^5$ and $R^6$ are preferably a hydrogen atom, a $(C_1-C_{30})$alkyl group, a $(C_6-C_{30})$aryl group or a $(C_6-C_{30})$ aryl$(C_1-C_{30})$alkyl group, more preferably a hydrogen atom or a $(C_1-C_{30})$alkyl group. $m_1$ is preferably an integer of 3 to 30, more preferably 3 to 15. $m_2$ is preferably an integer of 1 to 5000, more preferably 1 to 3000.

These compounds containing oxymethylene unit or compounds containing oxymethylene unit having substituent may be used singly or in the form of the mixture thereof.

As to specific examples of the compound containing oxymethylene unit represented by the formula (1), trioxane, paraldehyde, metacrolein and metaldehyde, preferably trioxane, paraldehyde and metaldehyde, more preferably trioxane and paraldehyde may be exemplified.

As to specific examples of the compound containing oxymethylene unit having substituent represented by the general formula (2), paraformaldehyde and polyacetal, preferably paraformaldehyde may be exemplified.

The cyclic ether compound having substituent used in the composition according to the present invention, is represented by the following formula (3):

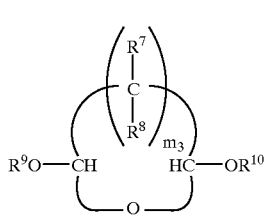

(3)

where $R^7$ and $R^8$ are independently a hydrogen atom, a $(C_1-C_{30})$alkyl group, $(C_3-C_{30})$cycloalkyl group, a $(C_2-C_{30})$ alkenyl group, a $(C_6-C_{30})$aryl group, a $(C_6-C_{30})$aryl $(C_1-C_{30})$alkyl group, a $(C_6-C_{30})$aryl$(C_2-C_{30})$alkenyl group, hydroxy group, a $(C_1-C_{30})$alkoxy group, a $(C_1-C_{30})$acyl group or a $(C_1-C_{30})$acyloxy group, in which the said aryl group, the said arylalkyl group and the said arylalkenyl group may have substituent group(s) bonded to the aromatic ring thereof, the substituent group(s) being a $(C_1-C_{10})$alkyl group or a halogen atom; $R^9$ and $R^{10}$ are independently a hydrogen atom, a $(C_1-C_{30})$alkyl group, a $(C_3-C_{30})$ cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl $(C_2-C_{30})$alkenyl group or a $(C_1-C_{30})$acyl group, in which the said aryl group, the said arylalkyl group and the said arylalkenyl group may have substituent group(s) bonded to the aromatic ring thereof, the substituent group(s) being a $(C_1-C_{10})$alkyl group or a halogen atom; and $m_3$ is an integer of not less than 1.

$R^7$ and $R^8$ are preferably a hydrogen atom, a $(C_1-C_{30})$ alkyl group, a $(C_2-C_{30})$alkenyl group, a $(C_6-C_{30})$aryl group, hydroxy group, a $(C_1-C_{30})$alkoxy group or a $(C_1-C_{30})$acyl group, more preferably a hydrogen atom or a $(C_1-C_{30})$alkyl group. $R^9$ and $R^{10}$ are preferably a hydrogen atom, a $(C_1-C_{30})$alkyl group, a $(C_2-C_{30})$alkenyl group or a $(C_6-C_{30})$ aryl group, more preferably a $(C_1-C_{30})$alkyl group or a $(C_6-C_{30})$aryl group. $m_3$ is preferably an integer of 1 to 10, more preferably 1 to 7.

These cyclic ether compounds having substituent may be used singly or in the form of the mixture thereof.

As to specific examples of the cyclic ether compound having substituent represented by the formula (3), 2,5-dimethoxy tetrahydrofuran, 2,5-diethoxy tetrahydrofuran, 2,5-diphenoxy tetrahydrofuran, 2,5-dimethoxy-3-formyl tetrahydrofuran, 2,5-dimethoxy-2,5-dihydrofuran, 2,6-dimethoxy tetrahydropyran or 2,6-diethoxy tetrahydropyran, preferably 2,5-dimethoxy tetrahydrofuran, 2,5-diphenoxy tetrahydrofuran or 2,6-dimethoxy tetrahydropyran, more preferably 2,5-dimethoxy tetrahydrofuran may be exemplified.

These compounds containing oxymethylene unit, compounds containing oxymethylene unit having substituent or cyclic ether compounds having substituent may be used singly or in the form of the mixture thereof.

The blending amount of these compounds containing oxymethylene unit, compounds containing oxymethylene unit having substituent or cyclic ether compounds having substituent, which is represented by the formula (1), (2) or (3), is in the range of 0.01 to 5 parts by weight based on 100 parts by weight of the polycarbonate resin. If the blending amount of the compounds containing oxymethylene unit, compounds containing oxymethylene unit having substituent or cyclic ether compounds having substituent is less than 0.01 parts by weight, the aimed effect of preventing the yellow discoloration upon exposure to an ionizing radiation may be insufficiently achieved. On the other hand, if the blending amount of the compounds containing oxymethylene unit, compounds containing oxymethylene unit having substituent or cyclic ether compounds having substituent is more than 5 parts by weight, mechanical properties of the resultant polycarbonate resin composition are unsuitably deteriorated. In order to attain both the aimed effect of preventing the yellow discoloration and the deterioration of the mechanical properties under well-balanced conditions, the blending amount of the compounds containing oxymethylene unit, compounds containing oxymethylene unit having substituent or cyclic ether compounds having substituent is preferably in the range of 0.05 to 3 parts by weight based on 100 parts by weight of the polycarbonate resin.

In order to enhance the technical merits of the polycarbonate resin composition, it is preferable to blend a compound containing sulfonate groups (A) with the resin composition.

The compound containing sulfonate groups used in the composition according to the present invention, are represented by the following formula (4), (5) or (6):

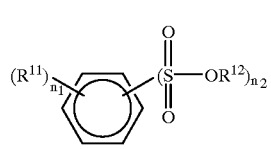

(4)

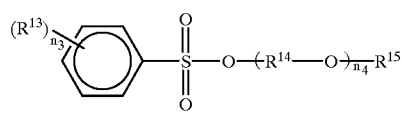

(5)

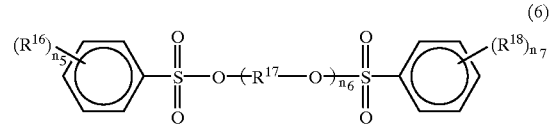

(6)

where $R^{11}$, $R^{13}$, $R^{16}$ and $R^{18}$ are independently a $(C_1-C_{30})$ alkyl group, a $(C_6-C_{30})$aryl group, a $(C_6-C_{30})$arylsulfone group or a halogen atom; $R^{12}$ and $R^{15}$ are independently a hydrogen atom, a $(C_1-C_{30})$alkyl group, a $(C_3-C_{30})$ cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl $(C_2-C_{30})$alkenyl group or a $(C_1-C_{30})$acyl group, in which the said aryl group, the said arylalkyl group and the said arylalkenyl group may have substituent group(s) bonded to the aromatic ring thereof, the substituent group(s) being a $(C_1-C_{10})$alkyl group or a halogen atom; $R^{14}$ and $R^{17}$ are independently a $(C_1-C_{15})$alkylene group, a $(C_2-C_{15})$ alkenylene group or a $(C_6-C_{30})$arylene group, in which the said arylene group may have substituent group(s) bonded to the aromatic ring thereof, the substituent group(s) being a $(C_1-C_{10})$alkyl group or a halogen atom; $n_1$, $n_3$, $n_5$ and $n_7$ are independently an integer of 0 to 5 and $n_2$ is an integer of 1 to 6, with provided that a sum of $n_1$ and $n_2$ is in the range of 1 to 6; and $n_4$ and $n_6$ are independently an integer of not less than 1.

$R^{11}$, $R^{13}$, $R^{16}$ and $R^{18}$ are preferably a $(C_1-C_{30})$alkyl group or a $(C_6-C_{30})$arylsulfone group, more preferably a ($C_1$–$C_{30}$)alkyl group. $R^{12}$ and $R^{15}$ are preferably a ($C_1$–$C_{30}$) alkyl group, a ($C_6$–$C_{30}$)aryl group, a ($C_6$–$C_{30}$)aryl($C_1$–$C_{30}$) alkyl group or a ($C_1$–$C_{30}$)acyl group, more preferably a ($C_1$–$C_{30}$)alkyl group, a ($C_6$–$C_{30}$)aryl group or a ($C_6$–$C_{30}$) aryl($C_1$–$C_{30}$)alkyl group. $R^{14}$ and $R^{17}$ are preferably a ($C_1$–$C_{15}$)alkylene group or a ($C_6$–$C_{30}$)arylene group, more preferably a ($C_1$–$C_{15}$)alkylene group. $n_4$ and $n_6$ are preferably an integer of 1 to 100.

These compound containing sulfonate groups may be used singly or in the form of the mixture thereof.

As to specific examples of the compound containing sulfonate groups represented by the formula (4), methyl benzene-sulfonate, phenyl benzene-sulfonate, methyl toluene-sulfonate, ethyl toluene-sulfonate, butyl toluene-sulfonate, phenyl toluene-sulfonate, benzyl toluene-sulfonate, phenathyl toluene-sulfonate, naphthyl toluene-sulfonate, methyl xylene-sulfonate, phenyl xylene-sulfonate, methyl mesitylene-sulfonate, phenyl mesitylene-sulfonate, methyl benzene-disulfonate, phenyl benzene-disulfonate, diphenyl-sulfone-3-methyl sulfonate and diphenyl-sulfone-3-phenyl sulfonate, preferably methyl toluene-sulfonate, phenyl toluene-sulfonate and benzyl toluene-sulfonate, more preferably methyl toluene-sulfonate and phenyl toluene-sulfonate may be exemplified.

As to specific examples of the compound containing sulfonate groups represented by the formula (5), methoxyethyl benzene-sulfonate, methoxymethyl toluene-sulfonate, methoxyethyl toluene-sulfonate, ethoxyethyl toluene-sulfonate, butoxyethyl toluene-sulfonate, phenoxyethyl toluene-sulfonate, benzyloxyethyl toluene-sulfonate, methoxyethyl xylene-sulfonate, methoxyethyl mesitylene-sulfonate, butoxyethoxyethyl toluene-sulfonate, phenoxyethoxyethyl toluene-sulfonate and benzyloxyethoxyethyl toluene-sulfonate, preferably methoxyethyl toluene-sulfonate and phenoxyethyl toluene-sulfonate, more preferably methoxyethyl toluene-sulfonate may be exemplified.

As to specific examples of the compound containing sulfonate groups represented by the formula (6), bis-tosyloxy methane, 1,2-bis-tosyloxy ethane, diethylene glycol-di-p-tosylate and tetraethylene glycol-di-p-tosylate, preferably 1,2-bis-tosyloxy ethane and tetraethylene glycol-di-p-tosylate, more preferably tetraethylene glycol-di-p-tosylate may be exemplified.

The blending amount of the compound containing sulfonate group, which is represented by the formula (4), (5) or (6), is not more than 5 parts by weight, preferably in the range of 0.01 to 5 parts by weight based on 100 parts by weight of the polycarbonate resin. If the blending amount of the compound containing sulfonate group is less than 0.01 parts by weight, the aimed effect of preventing the yellow discoloration upon exposure to an ionizing radiation may be insufficiently achieved. On the other hand, if the blending amount of the compound containing sulfonate group is more than 5 parts by weight, mechanical properties of the resultant polycarbonate resin composition may be unsuitably deteriorated. In order to attain both the aimed effect of preventing the yellow discoloration and the deterioration of the mechanical properties under well-balanced conditions, the blending amount of the compound containing sulfonate group is more preferably in the range of 0.05 to 3 parts by weight based on 100 parts by weight of the polycarbonate resin.

The weight ratio of the compound containing sulfonate group represented by the formula (4), (5) or (6) to the compound containing oxymethylene unit, the compound containing oxymethylene unit having substituent or the cyclic ether compound having substituent represented by the formula (1), (2) or (3) is not particularly limited, but is preferably in the range of 10/90 to 90/10, more preferably 20/80 to 80/20.

As described above, when the compound containing oxymethylene unit, the compound containing oxymethylene unit having substituent or the cyclic ether compound having substituent and the compound containing sulfonate group represented by the formula (4), (5) or (6) are blended at specified blending ratios with the polycarbonate resin, the resultant polycarbonate resin composition can exhibit no deterioration of its mechanical properties and a very low yellow discoloration upon exposure to an ionizing radiation for sterilization thereof.

In order to enhance the technical merits of the polycarbonate resin composition, it is preferable to blend a compound containing cyclic acetal groups (B) with the resin composition.

The compound containing cyclic acetal groups used in the composition according to the present invention, are represented by the following formula (7) or (8):

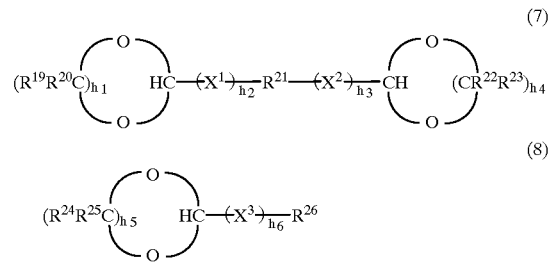

where $R^{19}$, $R^{20}$, $R^{22}$, $R^{23}$, $R^{24}$ and $R^{25}$ are independently a hydrogen atom, a ($C_1$–$C_{10}$)alkyl group, —$CH_2OH$, —$COOCH_3$, a phenyl group or a halogen atom; $R^{21}$ is a ($C_1$–$C_{15}$)alkylene group, a ($C_2$–$C_{15}$)alkenylene group or a ($C_6$–$C_{30}$)arylene group, in which the said arylene group may have substituent group(s) bonded to the aromatic ring thereof, the substituent group(s) being a ($C_1$–$C_{10}$)alkyl group or a halogen atom; $R^{26}$ is a hydrogen atom, a ($C_1$–$C_{30}$)alkyl group, a ($C_3$–$C_{30}$)cycloalkyl group, a ($C_2$–$C_{30}$)alkenyl group, a ($C_6$–$C_{30}$)aryl group, a ($C_6$–$C_{30}$) aryl($C_1$–$C_{30}$)alkyl group, a ($C_6$–$C_{30}$)aryl($C_2$–$C_{30}$)alkenyl group, a ($C_1$–$C_{30}$)alkoxy($C_1$–$C_{30}$)alkyl group, a ($C_1$–$C_{30}$) acyl group, a ($C_6$–$C_{30}$)aryl($C_1$–$C_{30}$)acyl group, a halogen atom, a halogenated ($C_1$–$C_{30}$)alkyl group, an amino group or an amino($C_1$–$C_{30}$)alkyl group, in which the said aryl group, the said arylalkyl group, the said arylalkenyl group or the said arylacyl group may have substituent group(s) bonded to the aromatic ring thereof, the substituent group(s) being a ($C_1$–$C_{10}$)alkyl group or a halogen atom; $X^1$, $X^2$ and $X^3$ are independently —$CHR^a$—, —O—, —NH— or —PH—, where $R^a$ is a hydrogen atom, a($C_1$–$C_{15}$)alkyl group or a ($C_6$–$C_{30}$)aryl group; and $h_2$, $h_3$ and $h_6$ are independently an integer of 0 or 1; and $h_1$, $h_4$ and $h_5$ are independently an integer of 1 to 10, and if $h_1$, $h_4$ and $h_5$ is not less than 2, the two or more of each of $R^{19}$, $R^{20}$, $R^{22}$ and $R^{23}$ in the formula (7), and $R^{24}$ and $R^{25}$ in the formula (8) may be the same or different.

$R^{19}$, $R^{20}$, $R^{22}$, $R^{23}$, $R^{24}$ and $R^{25}$ are preferably a hydrogen atom, a ($C_1$–$C_{10}$)alkyl group, —$CH_2OH$ or a phenyl group, more preferably a hydrogen atom or a ($C_1$–$C_{10}$)alkyl group. $R^{21}$ is preferably a ($C_1$–$C_{15}$)alkylene group or a ($C_6$–$C_{30}$) arylene group, more preferably a ($C_1$–$C_{15}$)alkylene group. $R^{26}$ is preferably a hydrogen atom, a ($C_1$–$C_{30}$)alkyl group, a ($C_6$–$C_{30}$)aryl group, a ($C_6$–$C_{30}$)aryl($C_1$–$C_{30}$)alkyl group or a ($C_1$–$C_{30}$)alkoxy($C_1$–$C_{30}$)alkyl group, more preferably a ($C_1$–$C_{30}$)alkyl group, a ($C_6$–$C_{30}$)aryl group or a ($C_6$–$C_{30}$) aryl($C_1$–$C_{30}$)alkyl group. $X^1$, $X^2$ and $X^3$ are preferably —$CHR^a$— or —O—. $h_1$, $h_4$ and $h_5$ are preferably an integer of 2 to 5.

These compound containing cyclic acetal groups may be used singly or in the form of the mixture thereof.

As to specific examples of the compound containing cyclic acetal groups represented by the formula (7), 2,2'-ethylene-bis-1,3-dioxolane, 2,2'-trimethylene-bis-1,3-dioxolane or 2,2'-phenylene-bis-1,3-dioxolane, preferably 2,2'-trimethylene-bis-1,3-dioxolane may be exemplified.

As to specific examples of the compound containing cyclic acetal groups represented by the formula (8), 1,3-dioxolane, 2-methyl-1,3-dioxolane, 2-methyl-4-methyl-1,3-dioxolane, 2-pentyl-4-methyl-1,3-dioxolane, 2-n-hexyl-1,3-dioxolane, 2-octyl-4-methyl-1,3-dioxolane, 2-methoxy-1,3-dioxolane, 2-chloromethyl-1,3-dioxolane, 2-bromomethyl-1,3-dioxolane, 2-(2-bromoethyl)-1,3-dioxolane, 2-aminomethyl-1,3-dioxolane, 2-(2-aminoethyl)-1,3-dioxolane, 2-phenyl-4-methyl-1,3-dioxolane, 4-phenyl-1,3-dioxolane, 2-(1-phenylethyl)-1,3-dioxolane, 2-(1-phenylethyl)-4-methyl-1,3-dioxolane, 2-benzyl-1,3-dioxolane, 2-benzyl-4-methyl-1,3-dioxolane, 2-benzyl-4,4-dimethyl-1,3-dioxolane, 2-benzyl-4-hydroxymethyl-1,3-dioxolane, 2-{2-(2-methoxyethoxy)ethoxy}-1,3-dioxolane, 2-benzyl-4,4-dimethyl-1,3-dioxane, 4-phenyl-4-phenyl-1,3-dioxane or 2-benzyl-5,5-dimethyl-1,3-dioxane, preferably 2-methoxy-1,3-dioxolane, 2-benzyl-1,3-dioxolane or 2-benzyl-4-methyl-1,3-dioxolane, more preferably 2-benzyl-1,3-dioxolane may be exemplified.

The blending amount of the compound containing cyclic acetal group which is represented by the formula (7) or (8), is not more than 5 parts by weight, preferably in the range of 0.01 to 5 parts by weight based on 100 parts by weight of the polycarbonate resin. If the blending amount of the compound containing cyclic acetal group is less than 0.01 parts by weight, the aimed effect of preventing the yellow discoloration upon exposure to an ionizing radiation may not be sufficiently achieved. On the other hand, if the blending amount of the compound containing cyclic acetal group is more than 5 parts by weight, mechanical properties of the resultant polycarbonate resin composition may be deteriorated. In order to attain both the effect of preventing the yellow discoloration and the deterioration of the mechanical properties under well-balanced conditions, the blending amount of the compound containing cyclic acetal group is more preferably in the range of 0.05 to 3 parts by weight based on 100 parts by weight of the polycarbonate resin.

The weight ratio of the compound containing cyclic acetal group represented by the formula (7) or (8) to the compound containing oxymethylene unit, the compound containing oxymethylene unit having substituent or the cyclic ether compound having substituent represented by the formula (1), (2) or (3) is not particularly limited, but is preferably in the range of 10/90 to 90/10, more preferably 20/80 to 80/20.

As described above, when the compound containing oxymethylene unit, the compound containing oxymethylene unit having substituent or the cyclic ether compound having substituent and the compound containing cyclic acetal group represented by the formula (7) or (8) are blended at specified blending ratios with the polycarbonate resin, the resultant polycarbonate resin composition can exhibit no deterioration of its mechanical properties and a very low yellow discoloration upon exposure to an ionizing radiation for sterilization thereof.

In order to enhance the technical merits of the polycarbonate resin composition, it is preferable to blend an aromatic compound containing oxy groups or carbonyl groups (C) with the resin composition.

The aromatic compound containing oxy groups or carbonyl groups used in the composition according to the present invention, are represented by the following formula (9) or (10):

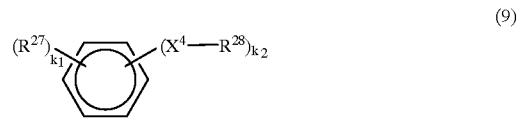

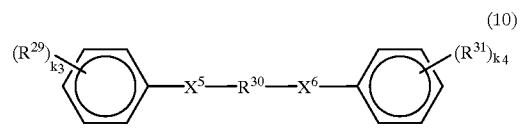

where $R^{27}$, $R^{29}$ and $R^{31}$ are independently a ($C_1$–$C_{10}$)alkyl group, a ($C_1$–$C_{10}$)alkoxy group, a ($C_1$–$C_{10}$)alkoxy($C_1$–$C_{10}$) alkyl group, a ($C_6$–$C_{15}$)aryl($C_1$–$C_{10}$)alkoxy($C_1$–$C_{10}$)alkyl group, —$CH_2OH$ or a halogen atom; $R^{30}$ is a ($C_1$–$C_{15}$) alkylene group, a ($C_2$–$C_{15}$)alkenylene group, a ($C_6$–$C_{30}$) arylene group, a ($C_1$–$C_{15}$)alkylene-dioxy group, or a ($C_6$–$C_{30}$)arylene-di($C_1$–$C_{15}$)alkylene-oxy group, in which the said arylene group or the said arylene-dialkylene-oxy group may have substituent group(s) bonded to the aromatic ring thereof, the substituent group(s) being a ($C_1$–$C_{10}$)alkyl group or a halogen atom; $X^4$, $X^5$ and $X^6$ are independently —O—, —$CHR^b$—O—, —CO—, —$CHR^c$—CO—, —CO—CO— or —CO—C($OR^d$)$_2$—; $R^{28}$ $R^b$, $R^c$ and $R^d$ are independently a hydrogen atom, a ($C_1$–$C_{30}$)alkyl group, a ($C_3$–$C_{30}$)cycloalkyl group, a ($C_2$–$C_{30}$)alkenyl group, a ($C_6$–$C_{30}$)aryl group, a ($C_6$–$C_{30}$)aryl($C_1$–$C_{30}$)alkyl group, a ($C_6$–$C_{30}$)aryl($C_2$–$C_{30}$)alkenyl group, a hydroxy group, a ($C_1$–$C_{30}$)alkoxy group, a ($C_6$–$C_{30}$)aryl($C_1$–$C_{30}$)alkoxy group, a ($C_6$–$C_{30}$)aryl($C_1$–$C_{30}$)alkyl($C_1$–$C_{30}$)alkoxy group, a ($C_1$–$C_{30}$)acyl group or a ($C_6$–$C_{30}$)aryl($C_1$–$C_{30}$)acyl group, in which the said aryl group, the said arylalkyl group, the said arylalkenyl group, the said arylalkoxy group, the said arylalkylalkoxy group or the said arylacyl group may have substituent group(s) bonded to the aromatic ring thereof, the substituent group(s) being a ($C_1$–$C_{10}$)alkyl group or a halogen atom; and $k_1$, $k_3$ and $k_4$ are independently an integer of 0 to 5 and $k_2$ is an integer of 1 to 6 with provided that a sum of $k_1$ and $k_2$ is in the range of 1 to 6, and if $k_2$ is an integer not less than 2, the $R^{28}$'s contained in the substituent groups bonded to the same aromatic ring may be covalently bonded with each other.

$R^{27}$, $R^{29}$ and $R^{31}$ are preferably a ($C_1$–$C_{10}$)alkyl group, a ($C_1$–$C_{10}$)alkoxy group, a ($C_1$–$C_{10}$)alkoxy($C_1$–$C_{10}$)alkyl group, more preferably a ($C_1$–$C_{10}$)alkyl group. $R^{30}$ is preferably a ($C_1$–$C_{15}$)alkylene group, a ($C_6$–$C_{30}$)arylene group or a ($C_1$–$C_{15}$)alkylene-dioxy group, more preferably a ($C_1$–$C_{15}$)alkylene group. $X^4$, $X^5$ and $X^6$ are preferably —O—, —$CHR^b$—O—, —CO— or —$CHR^c$—CO—, more preferably —$CHR^b$—O— or —$CHR^c$—CO—; $R^{28}$ $R^b$, $R^c$ and $R^d$ are preferably a ($C_1$–$C_{30}$)alkyl group, a ($C_6$–$C_{30}$)aryl group, a ($C_6$–$C_{30}$)aryl($C_1$–$C_{30}$)alkyl group, a ($C_6$–$C_{30}$)aryl ($C_2$–$C_{30}$)alkenyl group, a ($C_1$–$C_{30}$)alkoxy group or a ($C_6$–$C_{30}$)aryl($C_1$–$C_{30}$)alkoxy group, more preferably a ($C_1$–$C_{30}$)alkyl group, a ($C_6$–$C_{30}$)aryl group or a ($C_6$–$C_{30}$) aryl($C_1$–$C_{30}$)alkyl group.

The aromatic compound containing oxy groups or carbonyl groups may be used singly or in the form of the mixture thereof.

As to specific examples of the aromatic compound containing oxy groups or carbonyl groups represented by the formula (9), diphenyl ether, arylphenyl ether, dibenzyl ether, benzylmethyl ether, benzylphenyl ether, benzylnaphthyl ether, 1,4-benzodioxane, 1,2-methylene-dioxybenzene, piperonyl alcohol, benzophenone, dibenzyl ketone, benzylmethyl ketone, benzylphenyl ketone, benzyltolyl ketone, benzylnaphthyl ketone, dibenzoyl, benzoyl cyclobutane, benzoyl propane, benzoin, benzoin-ethyl-ether, 1,2-dibenzoyl benzene, 1,4-bis-methoxymethyl benzene, phenyl acetate-benzyl ester, benzyl benzoate, phthalic acid-benzylbutyl ester, dicyclohexyl phthalate or benzyldimethyl ketal, preferably diphenyl ether, dibenzyl ether, dibenzyl ketone, benzoin, benzyl benzoate or dicyclohexyl phthalate, more preferably dibenzyl ether may be exemplified.

As to specific examples of the aromatic compound containing oxy groups or carbonyl groups represented by the formula (10), dibenzoyl methane, dibenzoyl propane, 1,2-dibenzyloxy ethane, hydroquinone-dibenzyl ether or ethylene glycol dibenzoate, preferably 1,2-dibenzyloxy ethane or ethylene glycol dibenzoate, more preferably 1,2-dibenzyloxy ethane may be exemplified.

The blending amount of the aromatic compound containing oxy groups or carbonyl groups which is represented by the formula (9) or (10), is not more than 5 parts by weight, preferably in the range of 0.01 to 5 parts by weight based on 100 parts by weight of the polycarbonate resin. If the blending amount of the aromatic compound containing oxy groups or carbonyl groups is less than 0.01 parts by weight, the aimed effect of preventing the yellow discoloration upon exposure to an ionizing radiation may not be sufficiently achieved. On the other hand, if the blending amount of the aromatic compound containing oxy groups or carbonyl groups is more than 5 parts by weight, mechanical properties of the resultant polycarbonate resin composition may be deteriorated. In order to attain both the effect of preventing the yellow discoloration and the deterioration of the mechanical properties under well-balanced conditions, the blending amount of the aromatic compound containing oxy groups or carbonyl groups is more preferably in the range of 0.05 to 3 parts by weight based on 100 parts by weight of the polycarbonate resin.

The weight ratio of the aromatic compound containing oxy groups or carbonyl groups represented by the formula (9) or (10) to the compound containing oxymethylene unit, the compound containing oxymethylene unit having substituent or the cyclic ether compound having substituent represented by the formula (1), (2) or (3) is not particularly limited, but is preferably in the range of 10/90 to 90/10, more preferably 20/80 to 80/20.

As described above, when the compound containing oxymethylene unit, the compound containing oxymethylene unit having substituent or the cyclic ether compound having substituent and the aromatic compound containing oxy groups or carbonyl groups represented by the formula (9) or (10) are blended at specified blending ratios with the polycarbonate resin, the resultant polycarbonate resin composition can exhibit no deterioration of its mechanical properties and a very low yellow discoloration upon exposure to an ionizing radiation for sterilization thereof.

In order to enhance the technical merits of the polycarbonate resin composition, it is preferable to blend a polyalkylene glycol, the ether of polyalkylene glycol or the ester of polyalkylene glycol (D) with the resin composition.

The polyalkylene glycol, the ether of polyalkylene glycol or the ester of polyalkylene glycol (hereinafter referred to as polyalkylene glycol derivative) used in the composition according to the present invention may be those represented by the formula (11) or (12):

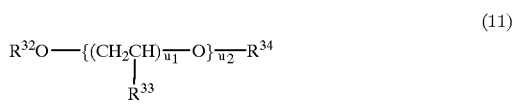

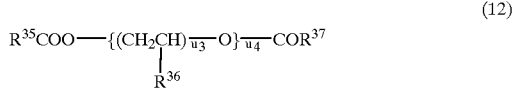

where $R^{32}$, $R^{34}$, $R^{35}$ and $R^{37}$ are independently a hydrogen atom, a $(C_1-C_{30})$alkyl group, a $(C_3-C_{30})$cycloalkyl group, a $(C_2-C_{30})$alkenyl group, a $(C_6-C_{30})$aryl group, a $(C_6-C_{30})$aryl$(C_{1-C30})$alkyl group or a $(C_6-C_{30})$aryl$(C_2-C_{30})$alkenyl group, in which the said aryl group, the said arylalkyl group and the said arylalkenyl group may have substituent group(s) bonded to the aromatic ring thereof, the substituent group(s) being a $(C_1-C_{10})$alkyl group or a halogen atom; $R^{33}$ and $R^{36}$ are independently a hydrogen atom or a $(C_1-C_4)$alkyl group; $u_2$ and $u_4$ are independently an integer of not less than 1; and $u_1$ and $u_3$ are independently an integer of 1 to 10.

$R^{32}$, $R^{34}$, $R^{35}$ and $R^{37}$ are preferably a hydrogen atom, a $(C_1-C_{30})$alkyl group, a $(C_2-C_{30})$alkenyl group, a $(C_6-C_{30})$aryl group or a $(C_6-C_{30})$aryl$(C_1-C_{30})$alkyl group, more preferably a hydrogen atom, a $(C_1-C_{30})$alkyl group, a $(C_6-C_{30})$aryl group or a $(C_6-C_{30})$aryl$(C_1-C_{30})$alkyl group. $u_2$ and $u_4$ are preferably an integer of 1 to 3000, more preferably 1 to 500, and $u_1$ and $u_3$ are preferably an integer of 1 to 7, more preferably 1 to 5.

These polyalkylene glycol derivatives may be used singly or in the form of the mixture thereof.

As to specific examples of the polyalkylene glycol derivatives represented by the formula (11), polyethylene glycol, polyethylene glycol methylether, polyethylene glycol dimethylether, polyethylene glycol dodecylether, polyethylene glycol benzylether, polyethylene glycol dibenzylether, polyethylene glycol-4-nonylphenylether, polypropylene glycol, polypropylene glycol methylether, polypropylene glycol dimethylether, polypropylene glycol dodecylether, polypropylene glycol benzylether, polypropylene glycol dibenzylether, polypropylene glycol-4-nonylphenylether or polytetramethylene glycol, preferably polyethylene glycol, polyethylene glycol dibenzylether, polypropylene glycol or polypropylene glycol dibenzylether, more preferably polyethylene glycol or polypropylene glycol may be exemplified.

As to specific examples of the polyalkylene glycol derivatives represented by the formula (12), polyethylene glycol diacetate, polyethylene glycol-(monoacetate) monopropionate, polyethylene glycol dibutyrate, polyethylene glycol distearate, polyethylene glycol dibenzoate, polyethylene glycol di-2, 6-dimethyl-benzoate, polyethylene glycol di-p-tert-butyl-benzoate, polyethylene glycol dicaprylate, polypropylene glycol diacetate, polypropylene glycol-(monoacetate)monopropionate, polypropylene glycol dibutyrate, polypropylene glycol distearate, polypropylene glycol dibenzoate, polypropylene glycol di-2, 6-dimethyl-benzoate, polypropylene glycol di-p-tert-butyl-benzoate or polypropylene glycol dicaprylate, preferably polyethylene glycol distearate or polypropylene glycol distearate, more preferably polypropylene glycol distearate may be exemplified.

The blending amount of the polyalkylene glycol derivative, which is represented by the formula (11) or (12), is not more than 5 parts by weight, preferably in the range of 0.01 to 5 parts by weight based on 100 parts by weight of the polycarbonate resin. If the blending amount of the polyalkylene glycol derivative is less than 0.01 parts by weight, the aimed effect of preventing the yellow discoloration upon exposure to an ionizing radiation may not be sufficiently achieved. On the other hand, if the blending amount of the polyalkylene glycol derivative is more than 5 parts by weight, mechanical properties of the resultant polycarbonate resin composition may be unsuitably deteriorated. In order to attain both the aimed effect of preventing the yellow discoloration and the deterioration of the mechanical properties under well-balanced conditions, the blending amount of the polyalkylene glycol derivative is more preferably in the range of 0.05 to 3 parts by weight based on 100 parts by weight of the polycarbonate resin.

The weight ratio of the polyalkylene glycol derivative represented by the formula (11) or (12) to the compound containing oxymethylene unit, the compound containing oxymethylene unit having substituent or the cyclic ether compound having substituent represented by the formula (1), (2) or (3) is not particularly limited, but is preferably in the range of 10/90 to 90/10, more preferably 20/80 to 80/20.

As described above, when the compound containing oxymethylene unit, the compound containing oxymethylene unit having substituent or the cyclic ether compound having substituent and the afore-mentioned polyalkylene glycol derivative of the formula (11) or (12) are blended at specified blending ratios with the polycarbonate resin, the resultant polycarbonate resin composition shows no deterioration of its mechanical properties and a very low yellow discoloration when exposed to an ionizing radiation for sterilization thereof.

In order to enhance the technical merits of the polycarbonate resin composition, it is preferable to blend a sulfide compound, sulfoxide compound or sulfone compound (E) with the resin composition.

The sulfide compounds used in the composition according to the present invention, are represented by the following formula (13) or (14):

  (13)

  (14)

where $R^{38}$, $R^{39}$, $R^{40}$, and $R^{42}$ are independently a $(C_1-C_{30})$ alkyl group, a $(C_3-C_{30})$cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl$(C_2-C_{30})$alkenyl group, a $(C_1-C_{30})$ acyl group, a $(C_1-C_{30})$acyl$(C_1-C_{30})$alkyl group, a $(C_1-C_{30})$ alkoxy$(C_1-C_{30})$alkyl group, a $(C_6-C_{30})$aryl$(C_1-C_{30})$alkoxy $(C_1-C_{30})$alkyl group or a $(C_6-C_{30})$aryl$(C_1-C_{30})$alkoxy $(C_2-C_{30})$alkenyl group, in which the said aryl group, the said arylalkyl group, the said arylalkenyl group, the said arylalkoxyalkyl group and the said arylalkoxyalkenyl group may have substituent group(s) bonded to the aromatic ring thereof, the substituent group(s) being a $(C_1-C_4)$alkyl group, a halogen atom, $—NO_2$, $—N(R^e)_2$, $—COOR^f$, $—OR^g$ or $—CH_2OR^h$, and in which the said acylalkyl group, the said alkoxyalkyl group, the said arylalkoxyalkyl group and the said arylalkoxyalkenyl group may have substituent group(s) bonded to the alkyl or alkenyl chain thereof, the substituent group(s) being a $(C_1-C_{10})$acyl group, a $(C_1-C_{10})$alkoxy group or a $(C_6-C_{15})$aryl$(C_1-C_{10})$alkoxy group; $R^{38}$ and $R^{39}$ or $R^{40}$ and $R^{42}$ may be covalently bonded with each other; $R^{41}$ is a $(C_1-C_{15})$alkylene group, a $(C_2-C_{15})$alkenylene group, a $(C_6-C_{30})$arylene group, a $(C_2-C_{15})$alkylidene group, a $(C_6-C_{15})$aryl$(C_2-C_{15})$alkylidene group or a di$(C_1-C_{15})$alkylene$(C_6-C_{30})$arylene group, in which the said arylene group, the said arylalkylidene group and the said dialkylenearylene group may have substituent group(s) bonded to the aromatic ring thereof, the substituent group(s) being a $(C_1-C_4)$alkyl group, a halogen atom, $—NO_2$, $—N(R^e)_2$, $—COOR^f$, $—OR^g$ or $—CH_2OR^h$; $R^e$, $R^f$, $R^g$ and $R^h$ are independently a hydrogen atom, a $(C_1-C_{10})$alkyl group, a $(C_6-C_{15})$aryl group or a $(C_6-C_{15})$aryl$(C_1-C_{10})$alkyl group; $t_1$, $t_2$ and $t_3$ are independently an integer of 1 to 10; and $t_4$ is an integer of 1 to 1000.

$R^{38}$, $R^{39}$, $R^{40}$, and $R^{42}$ are preferably a $(C_1-C_{30})$alkyl group, a $(C_3-C_{30})$cycloalkyl group, a $(C_2-C_{30})$alkenyl group, a $(C_6-C_{30})$aryl group, a $(C_6-C_{30})$aryl$(C_1-C_{30})$alkyl group, a $(C_1-C_{30})$acyl group or a $(C_1-C_{30})$alkoxy$(C_1-C_{30})$ alkyl group, more preferably a $(C_1-C_{30})$alkyl group, a $(C_3-C_{30})$cycloalkyl group, a $(C_6-C_{30})$aryl group or a $(C_6-C_{30})$aryl$(C_1-C_{30})$alkyl group, in which the said aryl group, the said arylalkyl group, the said arylalkenyl group, the said arylalkoxyalkyl group and the said arylalkoxyalkenyl group may have substituent group(s) bonded to the aromatic ring thereof, the substituent group(s) being preferably a $(C_1-C_4)$alkyl group, $COOR^f$ or $—OR^g$. $R^{41}$ is preferably a $(C_1-C_{15})$alkylene group, a $(C_6-C_{30})$arylene group or a $(C_2-C_{15})$alkylidene, more preferably a $(C_1-C_{15})$ alkylene group or a $(C_6-C_{30})$arylene group, in which the said arylene group, the said arylalkylidene group and the said dialkylenearylene group may have substituent group(s) bonded to the aromatic ring thereof, the substituent group(s) being preferably a $(C_1-C_4)$alkyl group, $—COOR^f$ or $—OR^g$. $t_4$ is preferably an integer of 1 to 500.

These sulfide compounds may be used singly or in the form of the mixture thereof.

As to specific examples of the sulfide compounds represented by the formula (13), dimethyl sulfide, dimethyl disulfide, dimethyl trisulfide, diethyl sulfide, divinyl sulfide, diphenyl sulfide, diphenyl disulfide, diphenyl trisulfide, bis (hydroxyphenyl) sulfide, ditolyl sulfide, ditolyl disulfide, bis(nitro-phenyl) sulfide, bis(aminophenyl) sulfide, bis (chlorophenyl) sulfide, bis(methoxyphenyl) sulfide, dibenzoyl sulfide, dibenzoyl disulfide, dibenzyl sulfide, dibenzyl disulfide, dibenzyl trisulfide, dibenzyl tetrasulfide, dibenzyl pentasulfide, dibenzyl hexasulfide, dibenzyl heptasulfide, dibenzyl octasulfide, dicyclohexyl sulfide, dicyclohexyl disulfide, methylcyclohexyl sulfide, methylphenyl sulfide, methylallyl sulfide, methylbenzyl sulfide, phenylallyl sulfide, phenylvinyl sulfide, phenylbenzyl sulfide, phenylstyryl sulfide, phenylcinnamyl sulfide, phenylbenzoyl sulfide, phenylphenacyl sulfide, phenylcyclohexyl sulfide, tolylbenzyl sulfide, benzylallyl sulfide, trimethylene sulfide, trimethylene disulfide, tetramethylene sulfide, tetramethylene disulfide, pentamethylene sulfide, thiophene, 4H-thiine, benzothiophene, dibenzothiophene, thiachromane or thiaxanthene, preferably diphenyl sulfide, diphenyl disulfide, dibenzyl sulfide, dibenzyl disulfide or dicyclohexyl disulfide, more preferably dibenzyl sulfide or dicyclohexyl disulfide may be exemplified.

As to specific examples of the sulfide compounds represented by the formula (14), diethylthioacetal, α-phenyldithioacetal, 1,1-bis(ethylthio)propane, 1,1-bis(ethylthio) propene, 1,4-bis(methyldithio)cyclohexane, 1,3-dithiolan, 1,3-dithiane, 1,4-dithiane, 1,4-dithiene, 1,4-dithiadiene, thianthrene, 1,3,5-trithiane or polyphenylenesulfide, preferably 1,3,5-trithiane may be exemplified.

The sulfoxide compounds used in the composition according to the present invention, are represented by the following formula (15), (16) or (17):

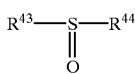

(15)

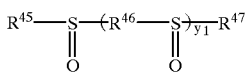

(16)

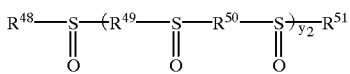

(17)

where $R^{43}$, $R^{44}$, $R^{45}$, $R^{47}$, $R^{48}$ and $R^{51}$ are independently a ($C_1$–$C_{30}$)alkyl group, a ($C_3$–$C_{30}$)cycloalkyl group, a ($C_2$–$C_{30}$)alkenyl group, a ($C_6$–$C_{30}$)aryl group, a ($C_6$–$C_{30}$)aryl($C_1$–$C_{30}$)alkyl group, a ($C_6$–$C_{30}$)aryl($C_2$–$C_{30}$)alkenyl group, a ($C_1$–$C_{30}$)acyl($C_1$–$C_{30}$)alkyl group, a ($C_1$–$C_{30}$)alkoxy($C_1$–$C_{30}$)alkyl group, a ($C_6$–$C_{30}$)aryl($C_1$–$C_{30}$)alkoxy (C1–$C_{30}$)alkyl group, a ($C_6$–$C_{30}$)aryl($C_1$–$C_{30}$)alkoxy ($C_2$–$C_{30}$)alkenyl group, a ($C_1$–$C_{30}$)alkoxy group, a ($C_1$–$C_{30}$)alkoxycarbonyl group, a ($C_2$–$C_{1000}$)polyethylene-glycol-ether group or a pyridyl group, in which the said aryl group, the said arylalkyl group, the said arylalkenyl group, the said arylalkoxyalkenyl group and the said arylalkoxyalkyl group may have substituent group(s) bonded to the aromatic ring thereof, the substituent group(s) being a ($C_1$–$C_4$)alkyl group, a halogen atom, —$NO_2$, —$N(R^i)_2$, —$COOR^j$, $OR^k$ or —$CH_2OR^m$, and in which the said acylalkyl group, the said alkoxyalkyl group, the said arylalkoxyalkenyl group and the said arylalkoxyalkyl group may have substituent group(s) bonded to the alkyl or alkenyl chain thereof, the substituent group(s) being a ($C_1$–$C_{30}$)acyl group, a ($C_1$–$C_{30}$)alkoxy group or a ($C_6$–$C_{30}$)aryl($C_1$–$C_{30}$)alkoxy group; $R^{43}$ and $R^{44}$ or $R^{45}$ and $R^{47}$ may be covalently bonded with each other; $R^{46}$, $R^{49}$ and $R^{50}$ are independently a ($C_1$–$C_{15}$)alkylene group, a ($C_2$–$C_{15}$)alkenylene group, —$O(CH_2CH_2O)_{y3}$—, a ($C_6$–$C_{30}$)arylene group or a di($C_1$–$C_{15}$)alkylene($C_6$–$C_{30}$)arylene group, in which the said arylene group and the said dialkylenearylene group may have substituent group(s) bonded to the aromatic ring thereof, the substituent group(s) being a ($C_1$–$C_4$)alkyl group, a halogen atom, —$NO_2$, —$N(R^i)_2$, —$COOR^j$, —$OR^k$ or —$CH_2OR^m$, and $R^{49}$ and $R^{50}$ are different from each other; $R^i$, $R^j$, $R^k$ and $R^m$ are independently a hydrogen atom, a ($C_1$–$C_{10}$)alkyl group, a ($C_6$–$C_{15}$)aryl group or a ($C_6$–$C_{15}$)aryl($C_1$–$C_{10}$)alkyl group; and $y_1$, $y_2$ and $y_3$ are independently an integer of 1 to 100.

$R^{43}$, $R^{44}$, $R^{45}$, $R^{47}$, $R^{48}$ and $R^{51}$ are preferably a ($C_1$–$C_{30}$) alkyl group, a ($C_3$–$C_{30}$)cycloalkyl group, a ($C_6$–$C_{30}$)aryl group or a ($C_6$–$C_{30}$)aryl($C_1$–$C_{30}$)alkyl group, more preferably a ($C_6$–$C_{30}$)aryl group, a ($C_6$–$C_{30}$)aryl($C_1$–$C_{30}$)alkyl group, in which the said aryl group, the said arylalkyl group, the said arylalkenyl group, the said arylalkoxyalkenyl group and the said arylalkoxyalkyl group may have substituent group(s) bonded to the aromatic ring thereof, the substituent group(s) being preferably a ($C_1$–$C_4$)alkyl group or —$OR^k$. $R^{46}$, $R^{49}$ and $R^{50}$ are preferably a ($C_1$–$C_{15}$)alkylene group or a ($C_6$–$C_{30}$)arylene group, in which the said arylene group and the said dialkylenearylene group may have substituent group(s) bonded to the aromatic ring thereof, the substituent group(s) being preferably a ($C_1$–$C_4$)alkyl group or —$OR^k$. $y_1$, $y_2$ and $y_3$ are preferably an integer of 1 to 50.

These sulfoxide compounds may be used singly or in the form of the mixture thereof.

As to specific examples of the sulfoxide compounds represented by the formula (15), dimethyl sulfoxide, dibutyl sulfoxide, diphenyl sulfoxide, dihydroxyphenyl sulfoxide, ditolyl sulfoxide, dibenzyl sulfoxide, divinyl sulfoxide, dixylyl sulfoxide, dimesityl sulfoxide, dinitrophenyl sulfoxide, diaminophenyl sulfoxide, dichlorophenyl sulfoxide, dimethoxyphenyl sulfoxide, dicyclohexyl sulfoxide, 1-propenylmethyl sulfoxide, methylcyclohexyl sulfoxide, methylphenyl sulfoxide, methyltolyl sulfoxide, methylmethoxyphenyl sulfoxide, methylchlorophenyl sulfoxide, methylcarboxyphenyl sulfoxide, methylallyl sulfoxide, methylbenzyl sulfoxide, phenylallyl sulfoxide, phenyltolyl sulfoxide, phenylxylyl sulfoxide, phenylmethoxyphenyl sulfoxide, phenylvinyl sulfoxide, phenylbenzyl sulfoxide, phenylstyryl sulfoxide, phenylcinnamyl sulfoxide, trimethyl-3-(phenylsulfinyl)ortho-propionate, phenylmethoxymethyl sulfoxide, phenylphenoxymethyl sulfoxide, phenylacetonyl sulfoxide, phenylphenathyl sulfoxide, phenylcyclohexyl sulfoxide, phenylmethylbenzyl sulfoxide, phenylmethoxycarbonyl sulfoxide, tolylbenzyl sulfoxide, tolylbutyl sulfoxide, tolylphenathyl sulfoxide, tolylbutoxy sulfoxide, tolylallyl sulfoxide, tolylaminophenyl sulfoxide, tolylchlorobenzyl sulfoxide, 4-(toluene-sulfinyl)butane-2-on, benzylallyl sulfoxide, 2-pyridylbenzyl sulfoxide, acetonylnitrophenyl sulfoxide, trimethylene sulfoxide, tetramethylene sulfoxide, pentamethylene sulfoxide, benzothiophene-1-oxide, dibenzothiophene-1-oxide, thioxanthene-9-oxide, 2, 5-dihydroxythiophene-1-oxide or 4-butylthian-1-oxide, preferably diphenyl sulfoxide, dibenzyl sulfoxide, phenylbenzyl sulfoxide or tetramethylene sulfoxide, more preferably diphenyl sulfoxide or dibenzyl sulfoxide may be exemplified.

As to specific examples of the sulfoxide compounds represented by the formula (16), bis(methylsulfinyl) methane, 2, 2-bis(methylsulfinyl)propane, bis (phenylsulfinyl)methane, 1, 2-bis(phenylsulfinyl)ethane, 1, 2-bis(phenylsulfinyl)ethylene, phenylsulfinyl-benzylsulfinyl-phenyl methane, 1, 4-dithian-1, 4-dioxide, polytetramethylene sulfoxide, polyhexamethylene sulfoxide, or the like may be exemplified.

As to specific examples of the sulfoxide compounds represented by the formula (17), poly (hexamethylenesulfoxide-co-octamethylenesulfoxide), poly (phenylenesulfoxide-co-hexamethylenesulfoxide), poly (hexamethylenesulfoxide-co-3, 6, 9, 12, 15, 18-hexaoxy-eicosanylene-sulfoxide), or the like may be exemplified.

The sulfone compounds used in the composition according to the present invention, are represented by the following formula (18), (19) or (20):

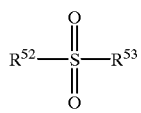

(18)

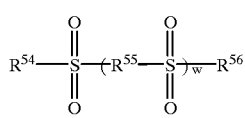

(19)

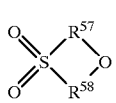

(20)

where $R^{52}$, $R^{53}$, $R^{54}$ and $R^{56}$ are independently a ($C_1$–$C_{30}$) alkyl group, a ($C_3$–$C_{30}$)cycloalkyl group, a ($C_2$–$C_{30}$)alkenyl group, a ($C_6$–$C_{30}$)aryl group, a ($C_6$–$C_{30}$)aryl($C_1$–$C_{30}$)alkyl group, a ($C_6$–$C_{30}$)aryl($C_2$–$C_{30}$)alkenyl group, a ($C_1$–$C_{30}$)

acyl($C_1$–$C_{30}$)alkyl group, a ($C_1$–$C_{30}$)alkoxy($C_1$–$C_{30}$)alkyl group, a ($C_6$–$C_{30}$)aryl($C_1$–$C_{30}$)alkoxy($C_1$–$C_{30}$)alkyl group, or a ($C_6$–$C_{30}$)aryl($C_1$–$C_{30}$)alkoxy($C_2$–$C_{30}$)alkenyl group, in which the said aryl group, the said arylalkyl group, the said arylalkenyl group, the said arylalkoxyalkyl group and the said arylalkoxyalkenyl group may have substituent group(s) bonded to the aromatic ring thereof, the substituent group(s) being a ($C_1$–$C_4$)alkyl group, a halogen atom, —$NO_2$, —$N(R^n)_2$, —$ORP$ or —$CH_2OR^q$, and in which the said acylalkyl group, the said alkoxyalkyl group, the said arylalkoxyalkyl group and the said arylalkoxyalkenyl group may have substituent group(s) bonded to its alkyl or alkenyl chain and selected from a ($C_1$–$C_{30}$)acyl group, a ($C_1$–$C_{30}$) alkoxy group or a ($C_6$–$C_{30}$)aryl($C_1$–$C_{30}$)alkoxy group, and $R^{52}$ and $R^{53}$, or $R^{54}$ and $R^{56}$ may be covalently bonded with each other; $R^{55}$, $R^{57}$ and $R^{58}$ are independently a ($C_1$–$C_{15}$) alkylene group, a ($C_2$–$C_{15}$)alkenylene group, or a ($C_6$–$C_{30}$) arylene group, in which the said arylene group may have substituent group(s) bonded to the aromatic ring thereof, the substituent group(s) being a ($C_1$–$C_4$)alkyl group, a halogen atom, —$NO_2$, —$N(R^n)_2$, —$ORP$ or —$CH_2OR^q$, where $R^n$, $R^p$ and $R^q$ are independently a hydrogen atom, a ($C_1$–$C_{10}$) alkyl group, a ($C_6$–$C_{15}$)aryl group or a ($C_6$–$C_{15}$)aryl ($C_1$–$C_{10}$)alkyl group; and w is an integer of 1 to 100.

$R^{52}$, $R^{53}$, $R^{54}$ and $R^{56}$ are preferably a ($C_1$–$C_{30}$)alkyl group, a ($C_6$–$C_{30}$)aryl group, a ($C_6$–$C_{30}$)aryl($C_1$–$C_{30}$)alkyl group, a ($C_6$–$C_{30}$)aryl($C_2$–$C_{30}$)alkenyl group, more preferably a ($C_6$–$C_{30}$)aryl group, a ($C_6$–$C_{30}$)aryl($C_1$–$C_{30}$)alkyl group, in which the said aryl group, the said arylalkyl group, the said arylalkenyl group, the said arylalkoxyalkyl group and the said arylalkoxyalkenyl group may have substituent group(s) bonded to the aromatic ring thereof, the substituent group(s) being preferably a ($C_1$–$C_4$)alkyl group or—ORP. $R^{55}$, $R^{57}$ and $R^{58}$ are preferably a ($C_1$–$C_{15}$)alkylene group or a ($C_6$–$C_{30}$)arylene group, in which the said arylene group may have substituent group(s) bonded to the aromatic ring thereof, the substituent group(s) being preferably a ($C_1$–$C_4$) alkyl group or —ORP. w is preferably an integer of 1 to 50.

These sulfone compounds may be used singly or in the form of the mixture thereof.

As to specific examples of the sulfone compounds represented by the formula (18), dimethyl sulfone, dibutyl sulfone, diphenyl sulfone, dihydroxyphenyl sulfone, ditolyl sulfone, dixylyl sulfone, dimesityl sulfone, dinitrophenyl sulfone, diaminophenyl sulfone, dichlorophenyl sulfone, dimethoxyphenyl sulfone, divinyl sulfone, dicyclohexyl sulfone, dibenzyl sulfone, 1-propenylmethyl sulfone, methylphenyl sulfone, methyltolyl sulfone, methylcyclohexyl sulfone, methylmethoxyphenyl sulfone, methylchlorophenyl sulfone, methylallyl sulfone, methylbenzyl sulfone, phenylallyl sulfone, phenyltolyl sulfone, phenylxylyl sulfone, phenylmethoxyphenyl sulfone, phenylvinyl sulfone, phenylbenzyl sulfone, phenylstyryl sulfone, phenylcinnamyl sulfone, trimethyl-3-(phenylsulfonyl)ortho-propionate, phenylmethoxymethyl sulfone, phenylphenoxymethyl sulfone, phenylacetonyl sulfone, phenylphenathyl sulfone, phenylcyclohexyl sulfone, phenylmethyl-benzene-sulfone, phenylmethoxycarbonyl sulfone, tolylallyl sulfone, tolylbutyl sulfone, tolylphenathyl sulfone, tolylbenzyl sulfone, tolylaminophenyl sulfone, tolylchlorobenzyl sulfone, 4-(toluene-sulfonyl)butane-2-on, benzylallyl sulfone, trimethylene sulfone, tetramethylene sulfone, pentamethylene sulfone, benzothiophene dioxide, dibenzothiophene dioxide, thioxanthene-9, 9-dioxide, 2, 5-dihydroxythiophene- 1, 1-dioxide or 4-butylthian-1,1-dioxide, preferably diphenyl sulfone, dibenzyl sulfone, tolylbenzyl sulfone or tetramethylene sulfone, more preferably diphenyl sulfone may be exemplified.

As to specific examples of the sulfone compounds represented by the formula (19), bis(methylsulfonyl)methane, 2, 2-bis(methylsulfonyl)propane, bis(phenylsulfonyl) methane, 1, 2-bis(phenylsulfonyl)ethane, 1, 2-bis (phenylsulfonyl)ethylene, phenylsulfonyl-benzylsulfonyl-phenyl methane, or the like may be exemplified.

As to specific examples of the sulfone compounds represented by the formula (20), 1, 4-thioxane-1, 1-dioxide, or the like may be exemplified.

The blending amount of the sulfide compound, the sulfoxide compound or the sulfone compound, which is represented by the formula (13), (14), (15), (16), (17), (18), (19) or (20), is not more than 5 parts by weight, preferably in the range of 0.01 to 5 parts by weight based on 100 parts by weight of the polycarbonate resin. If the blending amount of the sulfide compound, the sulfoxide compound or the sulfone compound is less than 0.01 parts by weight, the aimed effect of preventing the yellow discoloration upon application of an ionizing radiation may not be sufficiently achieved. On the other hand, if the blending amount of the sulfide compound, the sulfoxide compound or the sulfone compound is more than 5 parts by weight, mechanical properties of the resultant polycarbonate resin composition may be unsuitably deteriorated. In order to attain both the effect of preventing the yellow discoloration and the deterioration of the mechanical properties under well-balanced conditions, the blending amount of the sulfide compound, the sulfoxide compound or the sulfone compound is more preferably in the range of 0.05 to 3 parts by weight based on 100 parts by weight of the polycarbonate resin.

The weight ratio of the sulfide compound, the sulfoxide compound or the sulfone compound represented by the formula (13), (14), (15), (16), (17), (18), (19) or (20) to the compound containing oxymethylene unit, the compound containing oxymethylene unit having substituent or the cyclic ether compound having substituent represented by the formula (1), (2) or (3) is not particularly limited, but is preferably in the range of 10/90 to 90/10, more preferably 20/80 to 80/20.

As described above, when the compound containing oxymethylene unit, the compound containing oxymethylene unit having substituent or the cyclic ether compound having substituent and the sulfide compound, the sulfoxide compound or the sulfone compound represented by the formula (13), (14), (15), (16), (17), (18), (19) or (20) are blended at specified blending ratios with the polycarbonate resin, the resultant polycarbonate resin composition can exhibit no deterioration of its mechanical properties and a very low yellow discoloration upon exposure to an ionizing radiation for sterilization thereof.

In order to enhance the technical merits of the polycarbonate resin composition, it is preferable to blend a cinnamyl-based compound (F) with the resin composition.

The cinnamyl-based compounds used in the composition according to the present invention, are represented by the following formula (21):

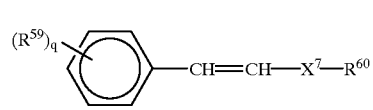

(21)

where $R^{59}$ is independently a ($C_1$–$C_{10}$)alkyl group, a ($C_1$–$C_{10}$)alkoxy group, —OH, $CH_2OH$ or a halogen atom; $X^7$ is —CO—, —COO—, —$CH_2O$—, —$CH_2$—CO— or —$CH_2O$ ; $R^{60}$ is independently a hydrogen atom, a ($C_1$–$C_{30}$)

alkyl group, a $(C_3-C_{30})$cycloalkyl group, a $(C_2-C_{30})$alkenyl group, a $(C_6-C_{30})$aryl group, a $(C_6-C_{30})$aryl$(C_1-C_{30})$alkyl group, a $(C_6-C_{30})$aryl$(C_2-C_{30})$alkenyl group, a $(C_1-C_{30})$ acyl group or a $(C_6-C_{30})$aryl$(C_1-C_{30})$acyl group, in which the said aryl group, the said arylalkyl group, the said arylalkenyl group and the said arylacyl group may have substituent group(s) bonded to the aromatic ring thereof, the substituent group(s) being a $(C_1-C_{10})$alkyl group, a $(C_1-C_{10})$alkoxy group, —OH, $CH_2OH$ or a halogen atom; and q is an integer of 0 to 5.

$R^{59}$ is preferably a $(C_1-C_{10})$alkyl group or a $(C_1-C_{10})$ alkoxy group, more preferably a $(C_1-C_{10})$alkyl group. $X^7$ is preferably —$CH_2O$—, —$CH_2$—$CO$— or —$CH_2O$—$COO$—, more preferably —$CH_2O$— or —$CH_2$—$CO$—. $R^{60}$ is preferably a hydrogen atom, a $(C_1-C_{30})$alkyl group, a $(C_6-C_{30})$aryl group, a $(C_6-C_{30})$aryl$(C_1-C_{30})$alkyl group, a $(C_1-C_{30})$acyl group or a $(C_6-C_{30})$aryl$(C_1-C_{30})$acyl group, more preferably a hydrogen atom, a $(C_1-C_{30})$alkyl group, a $(C_6-C_{30})$aryl group or a $(C_1-C_{30})$acyl group.

These cinnamyl-based compounds may be used singly or in the form of the mixture thereof.

As to specific examples of the cinnamyl-based compounds represented by the formula (21), cinnamyl alcohol, cinnamic aldehyde, methoxycinnamic aldehyde, cinnamylmethyl ether, cinnamylethyl ether, cinnamylallyl ether, cinnamylphenyl ether, cinnamylbenzyl ether, cinnamylmethyl ketone, cinnamylethyl ketone, cinnamylallyl ketone, cinnamylphenyl ketone, cinnamylmbenzyl ketone, cinnamyl acetate, cinnamyl propionate, cinnamyl butylate, cinnamyl benzoate, methyl cinnamate, methyl methylcinnamate, ethyl cinnamate, vinyl cinnamate, allyl cinnamate, phenyl cinnamate, benzyl cinnamate, cinnamyl cinnamate, cinnamylmethyl carbonate or cinnamylphenyl carbonate, preferably cinnamyl alcohol, cinnamylbenzyl ether, cinnamyl acetate, ethyl cinnamate or benzyl cinnamate, more preferably cinnamyl alcohol or cinnamyl acetate may be exemplified.

The blending amount of the cinnamyl-based compound, which is represented by the formula (21), is not more than 5 parts by weight, preferably in the range of 0.01 to 5 parts by weight based on 100 parts by weight of the polycarbonate resin. If the blending amount of the cinnamyl-based compound is less than 0.01 parts by weight, the aimed effect of preventing the yellow discoloration upon exposure to an ionizing radiation may not be sufficiently achieved. On the other hand, if the blending amount of the cinnamyl-based compound is more than 5 parts by weight, mechanical properties of the resultant polycarbonate resin composition may be unsuitably deteriorated. In order to attain both the aimed effect of preventing the yellow discoloration and the deterioration of the mechanical properties under well-balanced conditions, the blending amount of the cinnamyl-based compound is more preferably in the range of 0.05 to 3 parts by weight based on 100 parts by weight of the polycarbonate resin.

The weight ratio of the cinnamyl-based compound represented by the formula (21) to the compound containing oxymethylene unit, the compound containing oxymethylene unit having substituent or the cyclic ether compound having substituent represented by the formula (1), (2) or (3) is not particularly limited, but is preferably in the range of 10/90 to 90/10, more preferably 20/80 to 80/20.

As described above, when the compound containing oxymethylene unit, the compound containing oxymethylene unit having substituent or the cyclic ether compound having substituent and the afore-mentioned the cinnamyl-based compound of the formula (21) are blended at specified blending ratios with the polycarbonate resin, the resultant polycarbonate resin composition shows no deterioration of its mechanical properties and a very low yellow discoloration when exposed to an ionizing radiation for sterilization thereof.

When more than two compounds in (A)–(F) are blended with the polycarbonate resin composition according to the present invention, the blending amount of the more than two compounds in (A)–(F) is preferably in the range of 0.01 to 5 parts by weight based on 100 parts by weight of the polycarbonate resin, and more preferably the blending amount of the more than two compounds in (A)–(F) and the compound containing oxymethylene unit, the compound containing oxymethylene unit having substituent or the cyclic ether compound having substituent is in the range of 0.01 to 5 parts by weight based on 100 parts by weight of the polycarbonate resin.

In the present invention, the blending of the compound containing oxymethylene unit, the compound containing oxymethylene unit having substituent or the cyclic ether compound having substituent and the compound selected from the group consisting of the afore-mentioned compounds (A) to (F) with the polycarbonate resin, can be carried out at any optional stage up to the production of a final molded product according to various methods known in the art. Examples of the blending methods may include a mixing method using a tumbler, a Henschel mixer or the like, a mixing method in which the afore-mentioned components are quantitatively fed into a hopper of an extruder, or the like.

The polycarbonate resin composition according to the present invention may further contain other additives to impart appropriate properties thereto, if required. Examples of the additives may include flame-retardants such as halogen compounds, phosphorus compounds or metal salts of sulfonic acid; flame-retardant assistants such as antimony compounds or zirconium compounds; melt drop- preventing agents upon ignition such as polytetrafluoroethylene or silicon compounds; impact modifiers such as elastomers; anti-oxidants; heat stabilizers; ultraviolet light absorbers; anti-static agents; plasticizers; mold release agents; lubricants; compatibilizing agents; foaming agents; reinforcing agents such as glass fiber, glass beads, glass flakes, carbon fiber, fibrous magnesium, potassium titanate whiskers, ceramic whiskers, mica or talc; filler; pigments; or the like. These additives may be used singly or in combination.

The polycarbonate resin composition can be formed into a molded product according to a conventional molding method such as an injection-molding method, a blow-molding method or the like. Specific examples of the medical supplies and appliances to which the polycarbonate resin composition according to the present invention is suitably applied, include an artificial dialyzer, an artificial lung, an anesthetic inhaler, a vein connector or accessories, a hemo-centrifugal bowl, surgical appliances, appliances for an operation room, tubes for feeding oxygen into blood, connectors for tubes, cardiac probes and injectors, containers for the surgical appliances, the appliances for an operation room or an intravenous injection liquid, or the like.

The polycarbonate resin composition according to the present invention can prevent the generation of yellow discoloration when exposed to an ionizing radiation for sterilization while maintaining inherent properties of polycarbonate resin , and excellent mold-release properties. Accordingly, the polycarbonate resin composition according to the present invention is useful for medical products, medical apparatuses, components for such medical apparatuses, or the like.

EXAMPLES

The present invention is described in more detail below by way of the examples. However, the examples are only illustrative and therefore the present invention is not limited to these examples.

EXAMPLES 1 TO 35 AND COMPARATIVE EXAMPLES 1 TO 7

A compound containing oxymethylene unit, a compound containing oxymethylene unit having substituent or cyclic ether compound having substituent; a compound containing sulfonate groups; a compound containing cyclic acetal groups; an aromatic compound containing oxy groups or carbonyl groups; a polyalkylene glycol, ether of polyalkylene glycol or ester of polyalkylene glycol; a sulfide compound, sulfoxide compound or sulfone compound; and a cinnamyl-based compound, shown in Table 1 were blended, at blending ratios also shown in Table 1, with 100 parts by weight of a polycarbonate resin (Iupiron S-2000 having a viscosity-average molecular weight of 25,000, produced by Mitsubishi Engineering Plastics Co., Ltd.) in a tumbler. The mixture was fed into a vented single-screw extruder having an screw diameter of 40 mmφ and extruded into pellets at a barrel temperature of 270° C.

The thus-prepared pellets were dried in a hot-air drier at a temperature of 120° C. for not less than 5 hours. Thereafter, the dried pellets were injection-molded at a resin temperature of 270° C. and mold temperature of 80° C. to prepare a test specimen having a diameter of 50 mmφ and a thickness of 3 mm.

The thus-obtained test specimens were exposed to 25 kGy of a cobalt-60 gamma radiation and then they were measured the change in yellowness index ($\Delta YI$) thereof. The measurements of the yellowness index of the test specimens were carried out according to JIS K7103 by using a color difference meter (SM-3-CH, manufactured by SUGA Test Instruments Co., Ltd.). The results are also shown in Table 1.

Meanwhile, the yellowness index of the polycarbonate resin composition according to the present invention was normally not more than 8.5.

TABLE 1

| Example No. | a compound containing oxymethylene unit, a compound containing oxymethylene unit having substituent or cyclic ether compound having substituent | Blending ratio (part by weight) | $\Delta YI$ |
| --- | --- | --- | --- |
| Example 1 | paraldehyde | 0.5 | 7.8 |
| Example 2 | 2,5-dimethoxytetrahydrofuran | 0.5 | 5.5 |
| Example 3 | trioxane | 1.0 | 7.9 |
| Example 4 | metaldehyde | 1.5 | 7.2 |
| Example 5 | 2,6-dimethoxytetrahydropyran | 0.25 | 8.0 |
| Comparative Example 1 | none | — | 18.1 |

| Example No. | a compound containing oxymethylene unit, a compound containing oxymethylene unit having substituent or cyclic ether compound having substituent/ compound containing sulfonate groups | Blending ratio (part by weight) | $\Delta YI$ |
| --- | --- | --- | --- |
| Example 6 | trioxane/phenyl toluene-sulfonate | 0.5/0.5 | 5.5 |
| Example 7 | Paraldehyde/methyl toluene-sulfonate | 0.25/0.5 | 6.8 |
| Example 8 | 2,5-dimethoxytetrahydro-furan/ phenyl toluene-sulfonate | 0.25/0.25 | 7.5 |
| Example 9 | 2,5-dimethoxytetrahydro-furan/methoxyethyl toluene-sulfonate | 0.5/0.25 | 6.2 |
| Example 10 | paraldehyde/tetraethylene glycol-ditosylate | 1.0/0.5 | 5.1 |
| Comparative Example 2 | —/methyl toluene-sulfonate | —/0.5 | 14.5 |

| Example No. | a compound containing oxymethylene unit, a compound containing oxymethylene unit having substituent or cyclic ether compound having substituent/ compound containing cyclic acetal group | Blending ratio (part by weight) | $\Delta YI$ |
| --- | --- | --- | --- |
| Example 11 | paraldehyde/2-benzyl-1,3-dioxolane | 0.5/0.5 | 4.5 |
| Example 12 | 2,5-dimethoxytetrahydro-furan/2,2'-trimethylene bis-1,3-dioxolane | 0.25/0.25 | 4.2 |
| Example 13 | trioxane/2-benzyl-4-methyl-1,3-dioxolane | 0.2/0.2 | 7.1 |
| Example 14 | methaldehyde/2-methoxy-1,3-dioxolane | 0.75/0.5 | 7.5 |
| Example 15 | 2,6-dimethoxytetrahydro-pyran/2-benzyl-1,3-dioxolane | 0.75/0.75 | 6.3 |
| Comparative Example 3 | —/2-benzyl-1,3-dioxolane | —/0.5 | 10.5 |

| Example No. | a compound containing oxymethylene unit, a compound containing oxymethylene unit having substituent or cyclic ether compound having substituent/ aromatic compound containing oxy group or carbonyl group | Blending ratio (part by weight) | $\Delta YI$ |
| --- | --- | --- | --- |
| Example 16 | trioxane/dibenzyl ether | 0.2/0.2 | 6.8 |
| Example 17 | Paraldehyde/1,2-dibenzyloxy ethane | 0.5/0.25 | 6.0 |
| Example 18 | 2,5-dimethoxytetrahydro-furan/benzyl benzoate | 0.25/0.5 | 6.2 |
| Example 19 | trioxane/benzoin | 0.5/0.5 | 5.4 |
| Example 20 | metaldehyde/dicyclohexyl phthalate | 0.5/0.75 | 7.0 |
| Comparative Example 4 | —/benzyl benzoate | —/1.0 | 10.3 |

| Example No. | a compound containing oxymethylene unit, a compound containing oxymethylene unit having substituent or cyclic ether compound having substituent/ polyalkylene glycol, ether of polyalkylene glycol or ester of polyalkylene glycol *) | Blending ratio (part by weight) | $\Delta YI$ |
| --- | --- | --- | --- |
| Example 21 | trioxane/PPG2000 | 0.5/0.5 | 6.2 |
| Example 22 | paraldehyde/PEG1000 | 0.25/0.25 | 7.3 |
| Example 23 | 2,5-dimethoxytetrahydro-furan/PPGST30 | 0.2/0.5 | 6.8 |
| Example 24 | metaldehyde/PPG2000 | 0.75/0.5 | 6.3 |
| Example 25 | 2,5-dimethoxytetrahydro-pyran/PPGST30 | 0.5/0.5 | 7.0 |
| Comparative | —/PPG2000 | —/1.0 | 12.7 |

TABLE 1-continued

Example 5

| Example No. | a compound containing oxymethylene unit, a compound containing oxymethylene unit having substituent or cyclic ether compound having substituent/sulfide compound, sulfoxide compound or sulfone compound | Blending ratio (part by weight) | ΔYI |
|---|---|---|---|
| Example 26 | trioxane/diphenyl sulfoxide | 0.5/0.5 | 4.3 |
| Example 27 | paraldehyde/diphenyl sulfone | 0.5/0.25 | 6.8 |
| Example 28 | 2,5-dimethoxytetrahydro-furan/dicyclohexyl disulfide | 0.2/0.2 | 4.3 |
| Example 29 | metaldehyde/dibenzyl sulfide | 0.25/0.25 | 5.9 |
| Example 30 | 2,5-dimethoxytetrahydro-pyran/diphenyl sulfoxide | 0.5/0.5 | 5.1 |
| Comparative Example 6 | —/diphenyl sulfoxide | —/1.0 | 12.3 |

| Example No. | a compound containing oxymethylene unit, a compound containing oxymethylene unit having substituent or cyclic ether compound having substituent/cinnamyl-based compound | Blending ratio (part by weight) | ΔYI |
|---|---|---|---|
| Example 31 | trioxane/ cinnamyl acetate | 0.5/0.5 | 6.1 |
| Example 32 | paraldehyde/ ethyl cynnamate | 0.5/0.75 | 7.2 |
| Example 33 | 2,5-dimethoxytetrahydro-furan/ benzyl cinnamate | 0.25/0.5 | 6.8 |
| Example 34 | metaldehyde/ cinnamyl alcohol | 0.2/0.2 | 6.5 |
| Comparative Example 7 | —/ cinnamyl acetate | —/0.5 | 10.5 |

| Example No. | a compound containing oxymethylene unit, a compound containing oxymethylene unit having substituent or cyclic ether compound having substituent/ aromatic compound containing oxy group or carbonyl group/ compound containing sulfonate groups | Blending ratio (part by weight) | ΔYI |
|---|---|---|---|
| Example 35 | trioxane/dibenzyl ether/phenyl toluene-sulfonate | 0.33/0.33/0.33 | 5.4 |

*)
PEG1000: polyethylene glycol having an average molecular weight of 1,000.
PPG2000: polypropylene glycol having an average molecular weight of 2,000.
PPGST30: polypropylene glycol-distearate having an average molecular weight of 3,000.

What is claimed is:

1. A method for protecting polycarbonate resin composition-based medical supplies or appliances against discoloration when sterilized by an ionizing radiation, the method comprising using in said medical supplies or appliances a polycarbonate resin composition comprising:

100 parts by weight of a polycarbonate resin; and
   0.01 to 5 parts by weight of a substituted or unsubstituted compound containing an oxymethylene unit or a substituted cyclic ether compound,
   said substituted or unsubstituted compound containing an oxymethylene unit being represented by the following formula (1):

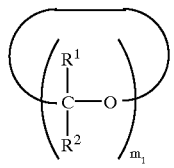

(1)

wherein $R^1$ and $R^2$ are independently a hydrogen atom, a $(C_1-C_{30})$ alkyl group, a $(C_3-C_{30})$ cycloalkyl group, a $(C_2-C_{30})$ alkenyl group, a $(C_6-C_{30})$ aryl group, a $(C_6-C_{30})$ aryl $(C_1-C_{30})$ alkyl group, a $(C_6-C_{30})$ aryl $(C_2-C_{30})$ alkenyl group, a hydroxy group, a $(C_1-C_{30})$ alkoxy group, a $(C_1-C_{30})$ acyl group or a $(C_1-C_{30})$ acyloxy group, in which said aryl group, said arylalkyl group and said arylalkenyl group may have substituent group(s) bonded to the aromatic ring thereof, the substituent group(s) being a $(C_1-C_{10})$ alkyl group or a halogen atom; and $m_1$ is an integer of not less than 3, and said substituted cyclic ether compound being represented by the following formula (3):

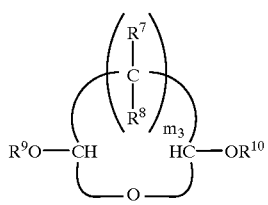

(3)

wherein $R^7$ and $R^8$ are independently a hydrogen atom, a $(C_1-C_{30})$ alkyl group, a $(C_3-C_{30})$ cycloalkyl group, a $(C_2-C_{30})$ alkenyl group, a $(C_6-C_{30})$ aryl group, a $(C_6-C_{30})$ aryl $(C_1-C_{30})$ alkyl group, a $(C_6-C_{30})$ aryl $(C_2-C_{30})$ alkenyl group, a hydroxy group, a $(C_1-C_{30})$ alkoxy group, a $(C_1-C_{30})$ acyl group or a $(C_1-C_{30})$ acyloxy group, in which said aryl group, said arylalkyl group and said arylalkenyl group may have substituent group(s) bonded to the aromatic ring thereof, the substituent group(s) being a $(C_1-C_{10})$ alkyl group or a halogen atom; $R^9$ and $R^{10}$ are independently a hydrogen atom, a $(C_1-C_{30})$ alkyl group, a $(C_3-C_{30})$ cycloalkyl group, a $(C_2-C_{30})$ alkenyl group, a $(C_6-C_{30})$ aryl group, a $(C_6-C_{30})$ aryl $(C_1-C_{30})$ alkyl group, a $(C_6-C_{30})$ aryl $(C_2-C_{30})$ alkenyl group or a $(C_1-C_{30})$ acyl group, in which said aryl group, said arylalkyl group and said arylalkenyl group may have substituent group(s) bonded to the aromatic ring thereof, the substituent group(s) being $(C_1-C_{10})$ alkyl group or a halogen atom; and $m_3$ is an integer of not less than 1.

2. A method according to claim 1, wherein the polycarbonate resin composition further comprises 0.01 to 5 parts by weight of a polyalkylene glycol, an ether of polyalkylene glycol or an ester of polyalkylene glycol.

3. A method according to claim 2, wherein the polyalkylene glycol, the ether of polyalkylene glycol or the ester of polyalkylene glycol is represented by the general formula (11) or (12):

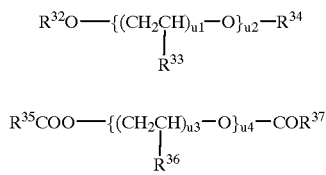

wherein $R^{32}$, $R^{34}$, $R^{35}$, and $R^{37}$ are independently a hydrogen atom, a ($C_1$–$C_{30}$) alkyl group, a ($C_3$–$C_{30}$) cycloalkyl group, a ($C_2$–$C_{30}$) alkenyl group, a ($C_6$–$C_{30}$) aryl group, a ($C_6$–$C_{30}$) aryl ($C_1$–$C_{30}$) alkyl group or a ($C_6$–$C_{30}$) aryl ($C_2$–$C_{30}$) alkenyl group, in which said aryl group, said arylalkyl group and said arylalkenyl group may have substituent group(s) bonded to the aromatic ring thereof, the substituent group(s) being a ($C_1$–$C_{10}$) alkyl group or a halogen atom; $R^{33}$ and $R^{36}$ are independently a hydrogen atom or a ($C_1$–$C_4$) alkyl group; $u_2$ and $u_4$ are independently an integer of not less than 1; and $u_1$ and $u_3$ are independently an integer of 1 to 10.

* * * * *